United States Patent
Schimings et al.

(10) Patent No.: US 9,121,439 B2
(45) Date of Patent: Sep. 1, 2015

(54) MULTI-PIECE SHIFTER CABLE SYSTEM

(75) Inventors: Michael W. Schimings, Lake Orion, MI (US); Hassan Kaddouh, Grosse Pointe Farms, MI (US)

(73) Assignee: DURA GLOBAL TECHNOLOGIES, LLC, Auburn Hills, MI (US)

( * ) Notice: Subject to any disclaimer, the term of this patent is extended or adjusted under 35 U.S.C. 154(b) by 0 days.

(21) Appl. No.: 13/456,580

(22) Filed: Apr. 26, 2012

(65) Prior Publication Data

US 2012/0272780 A1  Nov. 1, 2012

Related U.S. Application Data

(60) Provisional application No. 61/479,546, filed on Apr. 27, 2011, provisional application No. 61/479,567, filed on Apr. 27, 2011.

(51) Int. Cl.
*F16C 1/22* (2006.01)
*F16C 1/26* (2006.01)

(52) U.S. Cl.
CPC ............ *F16C 1/262* (2013.01); *Y10T 74/2045* (2015.01)

(58) Field of Classification Search
CPC ....................................... F16C 1/262
USPC ........... 74/500.5, 501.5 R, 502, 502.6, 502.4; 403/302, 316, 341
See application file for complete search history.

(56) References Cited

U.S. PATENT DOCUMENTS

| | | | | |
|---|---|---|---|---|
| 278,346 | A * | 5/1883 | Long ............................. | 439/846 |
| 3,513,719 | A * | 5/1970 | Tschanz ....................... | 74/502.6 |
| 3,988,943 | A * | 11/1976 | Orcutt ........................ | 74/502.5 |
| 4,223,564 | A * | 9/1980 | Fawcett ....................... | 74/502.4 |
| 4,378,713 | A * | 4/1983 | Haskell et al. ........... | 74/501.5 R |
| 4,501,404 | A * | 2/1985 | Nelson ....................... | 248/503.1 |
| 4,541,658 | A | 9/1985 | Bartholomew | |
| 4,682,513 | A | 7/1987 | Reeder | |
| 4,785,686 | A * | 11/1988 | Thomas ....................... | 74/502.4 |
| 4,936,161 | A * | 6/1990 | Polando ....................... | 74/502.6 |
| 5,002,315 | A | 3/1991 | Bartholomew | |
| 5,039,138 | A * | 8/1991 | Dickirson ..................... | 285/314 |
| 5,174,170 | A * | 12/1992 | Kato et al. ................... | 74/502.6 |
| 5,220,832 | A * | 6/1993 | Petruccello .................. | 74/502.4 |
| 5,413,387 | A | 5/1995 | Bartholomew | |
| 5,509,750 | A * | 4/1996 | Boike .......................... | 403/164 |
| 5,518,332 | A | 5/1996 | Katoh | |
| 5,536,103 | A * | 7/1996 | Sawada ........................ | 403/326 |
| 5,560,259 | A * | 10/1996 | Reasoner ................. | 74/501.5 R |
| 5,575,180 | A * | 11/1996 | Simon .......................... | 74/502.4 |
| 5,577,415 | A * | 11/1996 | Reasoner ..................... | 74/502.4 |
| 5,632,182 | A * | 5/1997 | Reasoner ..................... | 74/502.4 |
| 5,655,415 | A * | 8/1997 | Nagle et al. ................. | 74/502.6 |

(Continued)

*Primary Examiner* — Thomas R. Hannon
*Assistant Examiner* — Adam D Rogers
(74) *Attorney, Agent, or Firm* — Reising Ethington P.C.; Matthew J. Schmidt; Robert E. Ford

(57) ABSTRACT

In one embodiment there is provided a multiple piece shifter cable system. The cable pieces may each have a core section with a connector, and a conduit section with a connector. The core connectors may be coupled together to connect the core sections of the cable pieces and the conduit connectors may be coupled together to connect the conduit sections of the cable pieces. When mated together, the conduit connectors may surround at least a portion of the mated core connectors. Also, in at least some implementations, the act of mating together the conduit connectors may also mate together the core connectors.

16 Claims, 7 Drawing Sheets

(56) References Cited

U.S. PATENT DOCUMENTS

| | | |
|---|---|---|
| 5,664,462 A | 9/1997 | Reasoner |
| 5,779,279 A | 7/1998 | Bartholomew |
| 5,823,063 A | 10/1998 | Nagle et al. |
| 5,826,920 A | 10/1998 | Bartholomew |
| 5,839,325 A * | 11/1998 | Daumal Castellon ... 74/501.5 R |
| 6,010,160 A | 1/2000 | Bartholomew |
| 6,056,020 A * | 5/2000 | Malone .......................... 138/155 |
| 6,102,609 A * | 8/2000 | Tsuge .......................... 403/301 |
| 6,119,544 A * | 9/2000 | Cebollero ................... 74/502.4 |
| 6,247,380 B1 * | 6/2001 | Cebollero ................... 74/502.6 |
| 6,561,057 B2 * | 5/2003 | Cebollero ................... 74/502.4 |
| 7,188,545 B2 * | 3/2007 | Nagle et al. ................ 74/502.6 |
| 7,559,714 B2 * | 7/2009 | Ruhlander ................... 403/263 |
| 7,927,036 B2 * | 4/2011 | Reasoner ..................... 403/341 |
| 8,079,286 B2 * | 12/2011 | Nagle et al. ................. 74/502.6 |
| 8,141,454 B2 * | 3/2012 | Ruhlander et al. ........... 74/502.6 |
| 8,516,921 B2 * | 8/2013 | Gordy .......................... 74/502.6 |
| 2001/0013260 A1 * | 8/2001 | Cebollero ................ 74/501.5 R |
| 2009/0019965 A1 * | 1/2009 | Kwon .......................... 74/502.4 |
| 2009/0049947 A1 * | 2/2009 | Horinaka et al. ............. 74/502.4 |
| 2009/0120231 A1 * | 5/2009 | Ruhlander et al. ........... 74/502.4 |
| 2009/0238638 A1 * | 9/2009 | Ruhlander ................... 403/263 |
| 2009/0285625 A1 | 11/2009 | Reasoner |
| 2010/0089195 A1 * | 4/2010 | Koontz et al. ............ 74/501.5 R |
| 2010/0147100 A1 * | 6/2010 | Ruhlander et al. ........... 74/502.4 |
| 2011/0226083 A1 * | 9/2011 | Chiou .......................... 74/502.4 |
| 2011/0226084 A1 * | 9/2011 | Chiou .......................... 74/502.4 |

* cited by examiner

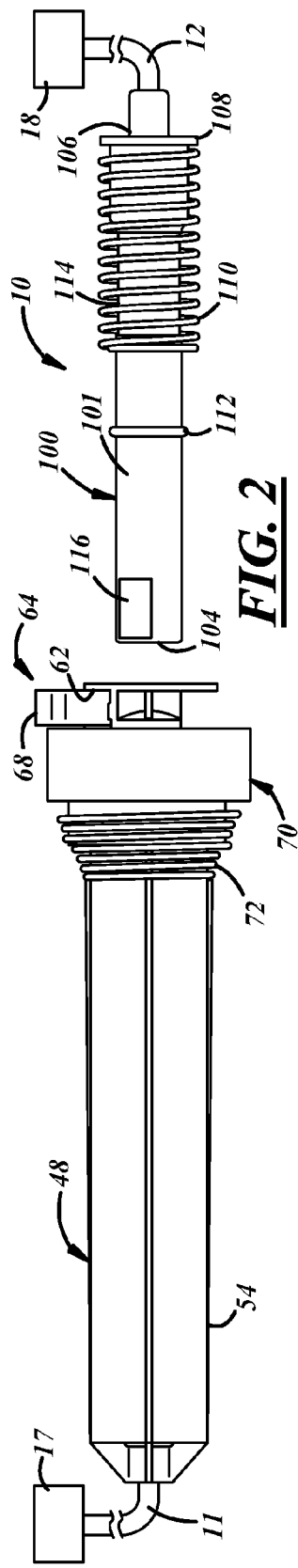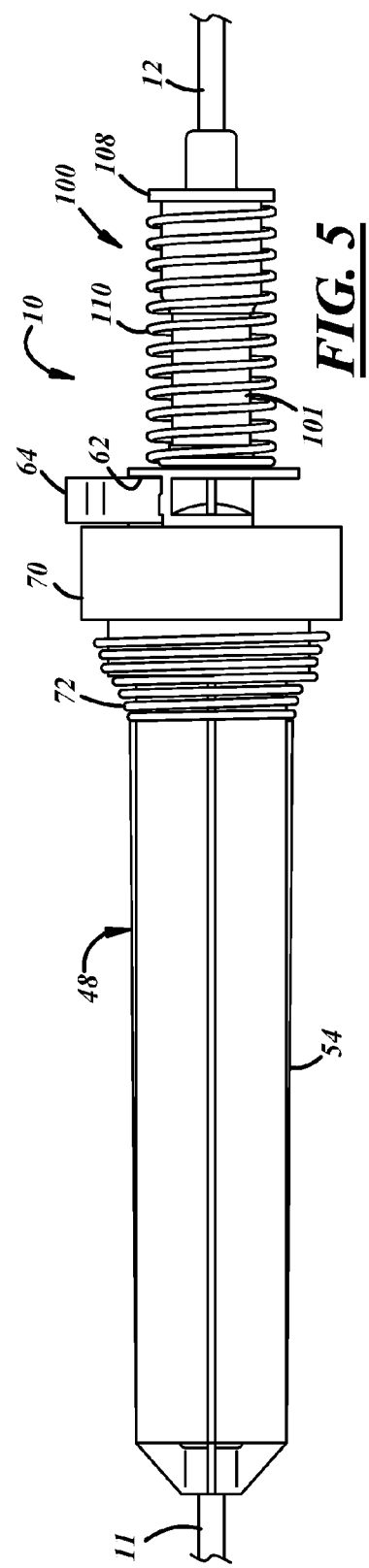

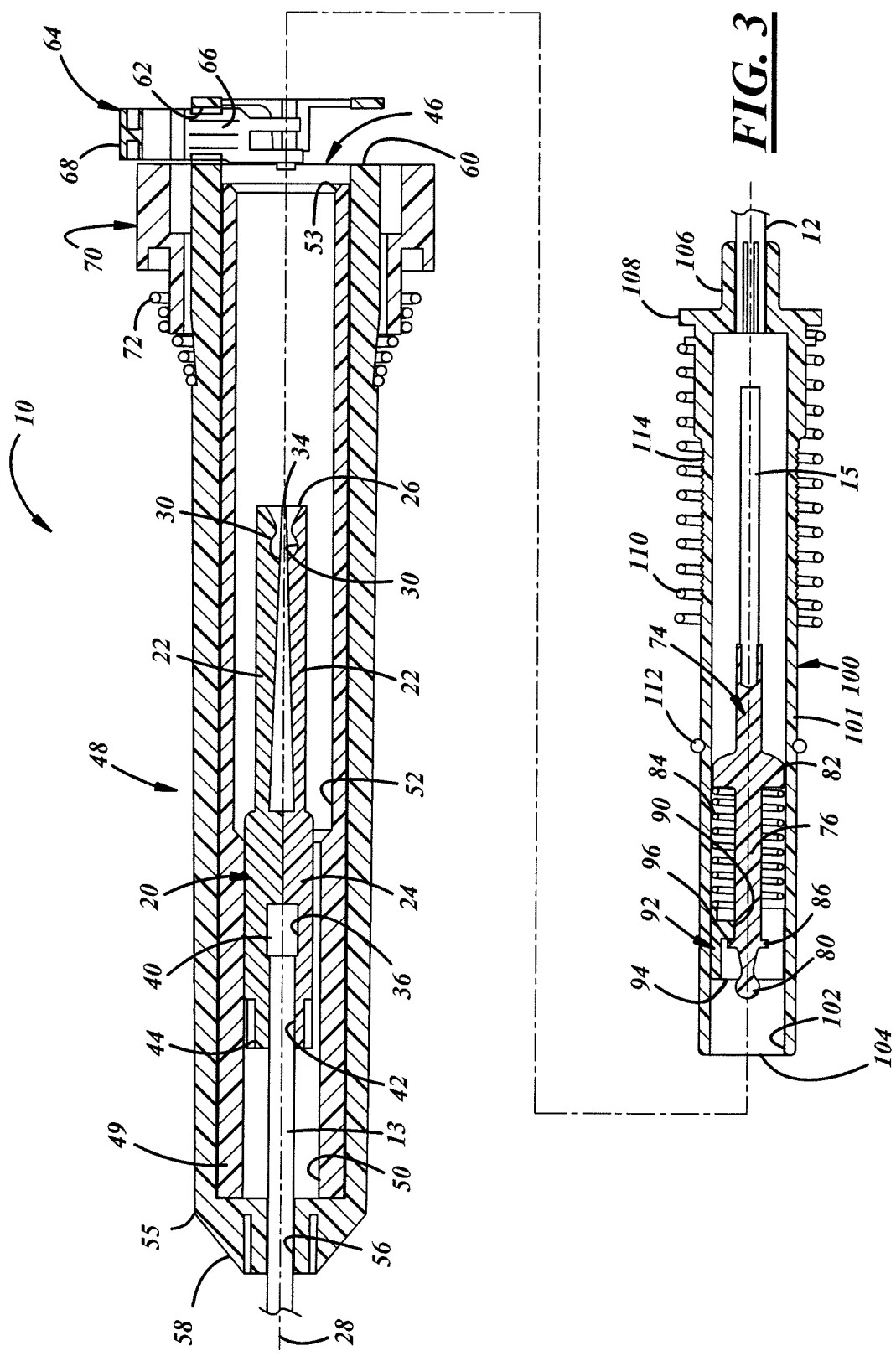

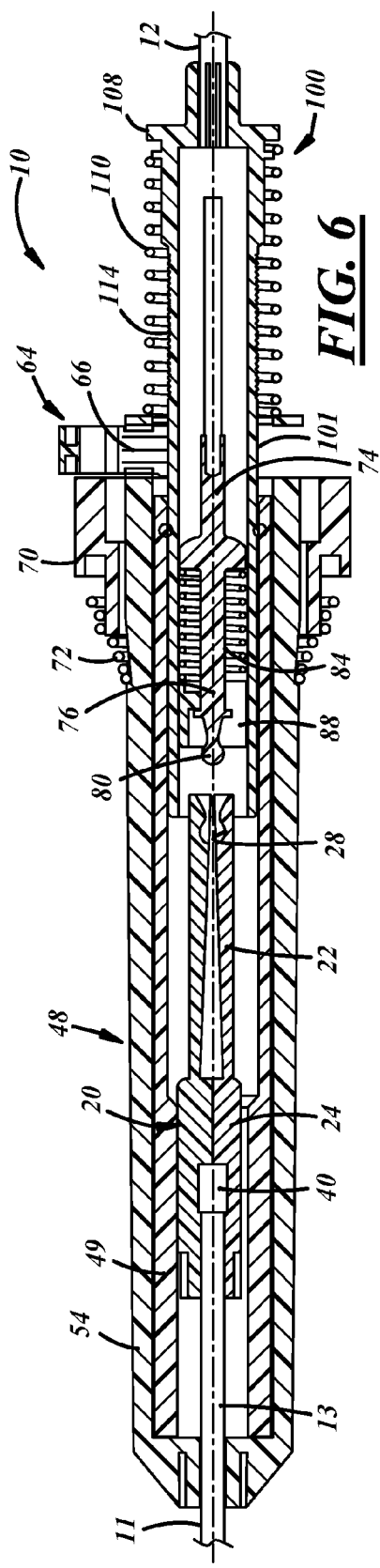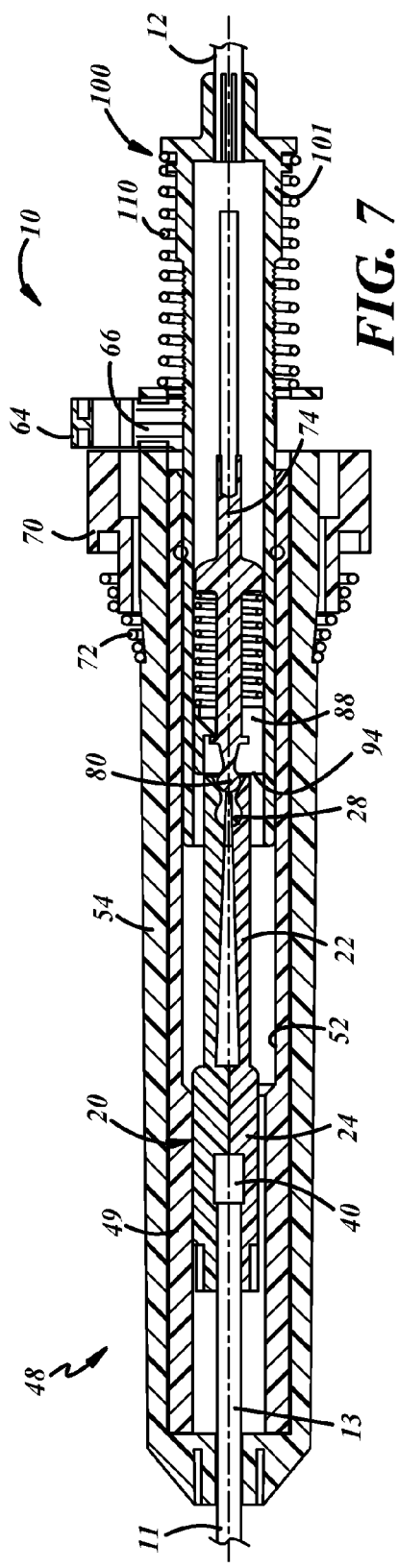

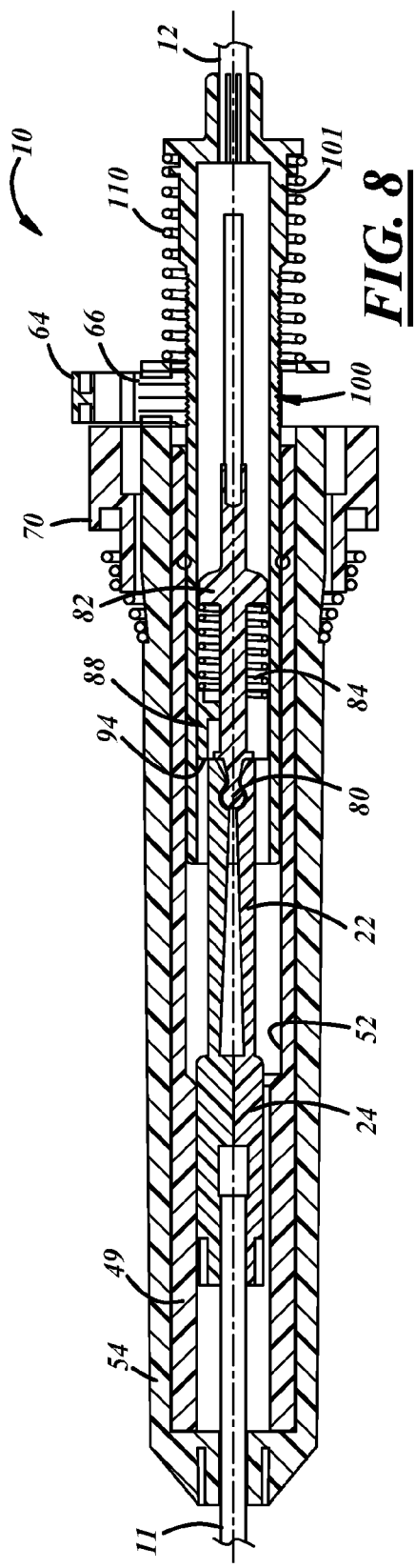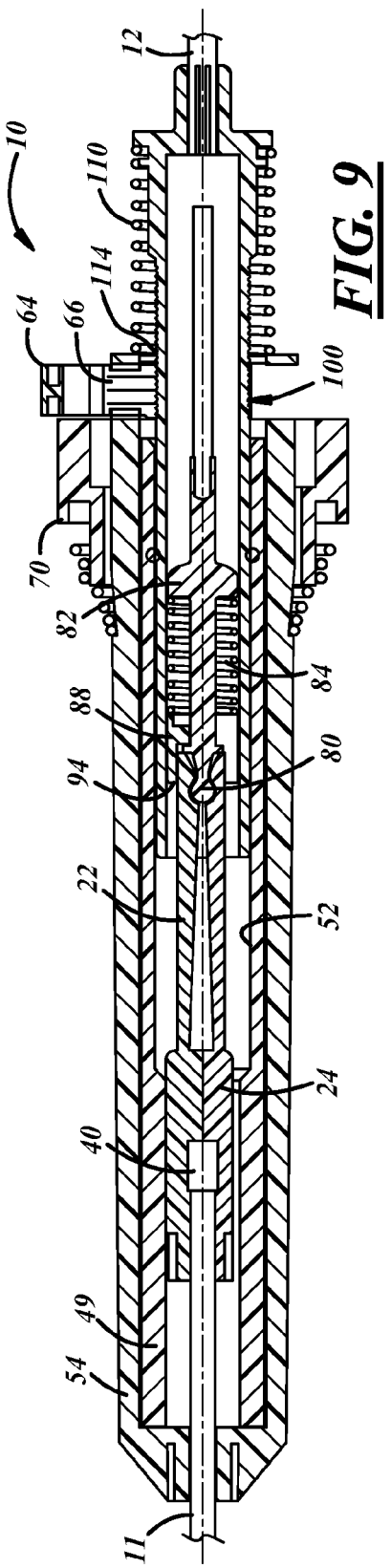

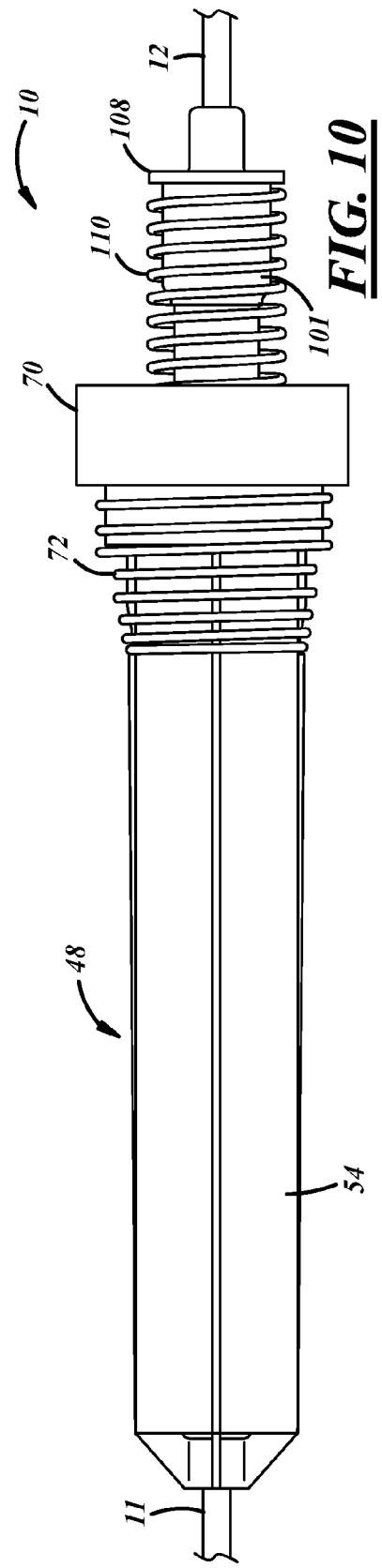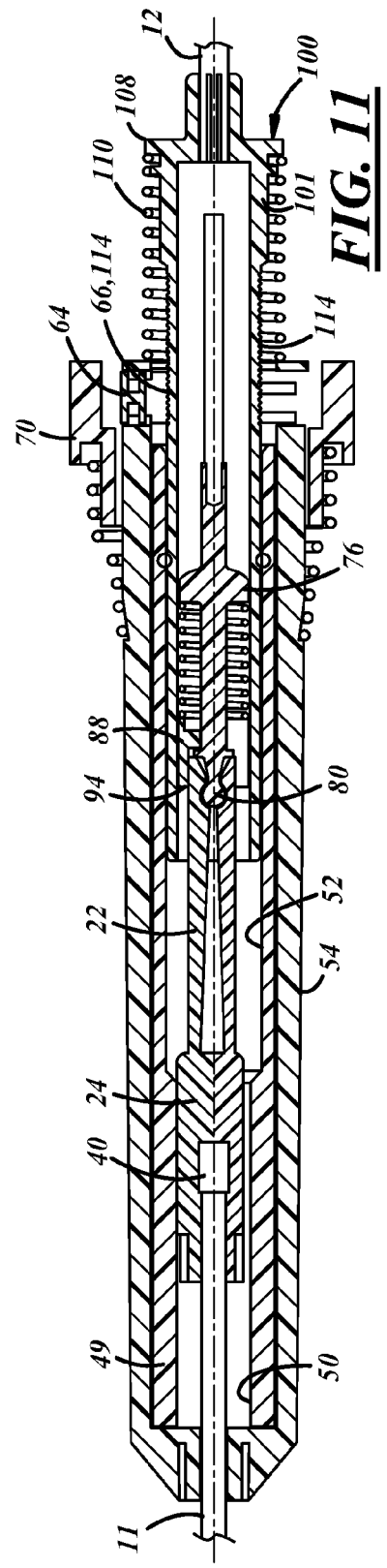

MULTI-PIECE SHIFTER CABLE SYSTEM

REFERENCE TO COPENDING APPLICATIONS

This application claims the benefit of U.S. Provisional Patent Application Ser. No. 61/479,546 filed Apr. 27, 2011 and 61/479,567 filed Apr. 27, 2011, which are incorporated herein by reference in their entirety.

TECHNICAL FIELD

The present disclosure relates to shift cable systems for a vehicle transmission, and more particularly to a multi-piece shift cable system.

BACKGROUND

Shift cables come in many different forms.

Examples of cable systems include U.S. Pat. Nos. 5,632,182; 6,056,020; 5,577,415; 5,664,462; 5,575,180; 5,509,750; 6,561,057; 6,247,380; 6,119,544; 5,413,387; 5,002,315; 4,541,658; 5,826,920; 6,010,160; 5,779,279; 5,039,138; 5,518,332; 5,536,103; 4,682,513; 6,102,609; 5,655,415; 5,823,063.

What is needed is a multi-part, shift cable system that is easy to connect the cable core pieces together and the conduit pieces together while at the same time being serviceable.

SUMMARY

In one embodiment there is provided a multiple piece push-pull shift cable system. The cable pieces may each have a core section with a connector, and a conduit section with a connector. The core connectors may be coupled together to connect the core sections of the cable pieces and the conduit connectors may be coupled together to connect the conduit sections of the cable pieces. When mated together, the conduit connectors may surround at least a portion of the mated core connectors.

In another embodiment there is provided a push-pull shift cable system, having multiple core sections coupled together with mating connectors and corresponding multiple conduit sections coupled together with mating tubes, the mating tubes of the conduit sections surrounding the mating core connectors to align and guide the movement of the core connectors during assembly.

In another embodiment there is provided a push-pull shift cable system having multiple core sections with mating connectors and corresponding multiple conduit sections with mating tubes, wherein coupling the mating tubes of the conduit sections also couples the connectors of the core sections.

In another embodiment there is provided a push-pull shift cable system having multiple core sections with mating connectors and corresponding multiple conduit sections with mating tubes, wherein the mating tubes of the conduit sections have a relief that removes tension on the conduit sections so that the mating tubes can be separated, at least one of the mating tubes having an access to the at least one of the mated core connectors that is exposed when the tubes are at least partially separated.

In another embodiment there is provided a push-pull shift cable system, having multiple flexible core sections with mating connectors and corresponding multiple conduit sections with mating tubes, wherein one or more of the mating tubes of the conduit sections block the flexible core section from flexing.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which:

FIG. 2 is a side view of a cable system for coupling together first and second cable sections, and showing first and second connectors of the cable system decoupled;

FIG. 3 is a sectional view of the cable system shown in the position of FIG. 2;

FIG. 5 is a side view of the cable system showing the first and second connectors in a mid-assembly position;

FIG. 6 is a sectional view of the cable system shown in the position of FIG. 5;

FIG. 7 is a sectional view of the cable system shown in a further assembled state than in FIG. 6;

FIG. 8 is a sectional view of the cable system shown in a further assembled state than in FIG. 7;

FIG. 9 is a sectional view of the cable system shown in a further assembled state than in FIG. 8;

FIG. 10 is a side view of the cable system shown in a further assembled state than in FIG. 9; and FIG. 11 is a sectional view of the cable system shown in the position of FIG. 10.

DETAILED DESCRIPTION OF PREFERRED EMBODIMENTS

Figure 1:
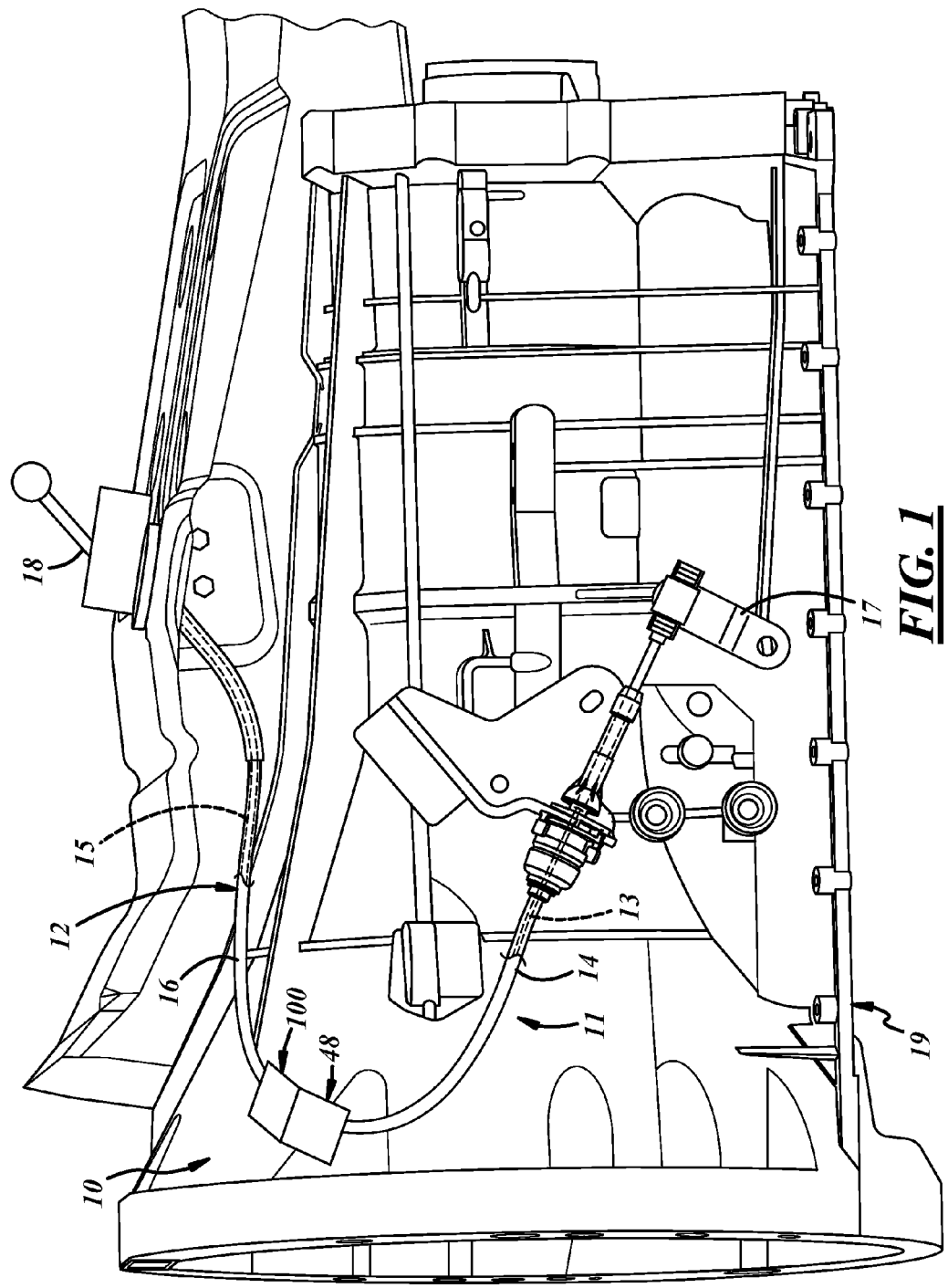
FIG. 1 is an overview of one implementation of a transmission shifter assembly having a multi-piece shift cable assembly connecting a shift lever to a transmission shifter.

Referring in more detail to the drawings, FIGS. 1-3 illustrate a cable system 10 having multiple pieces of cable adapted to be connected together. In at least one embodiment, the cable system 10 includes a first cable section 11 and a second cable section 12. The first cable section 11 may include a first core section 13 which may be a flexible stranded wire and a first conduit section 14 that may be plastic and tubular and in which at least a portion of the first core section is slidably received. The second cable section 12 may include a second core section 15 which may be a flexible stranded wire and a second conduit section 16 that may be plastic and tubular and in which at least a portion of the second core section is slidably received. The first core section 13 may be coupled to a first component 17, the second core section 15 may be coupled to a second component 18 and the first and second core sections 13, 15 may be coupled together to transmit force from one component to the other through the coupled cable sections 11, 12.

In one implementation, as shown in FIG. 1, the first component 17 may be a shift control arm for a vehicle transmission 19 and the second component 18 may be a vehicle shifter assembly such as may be controlled and manipulated by a driver of a vehicle. The first core section 13 and first conduit section 14 may be coupled, respectively, to the second core section 15 and second conduit section 16 so that the vehicle shifter assembly can control movement of the transmission shift lever via the coupled cable sections 11, 12 which form a generally unitary push-pull cable when coupled together. In at least one implementation, connection of the first and second core section 13, 15 is controlled or occurs automatically as the first and second conduit sections 14, 16 are coupled together.

This may facilitate coupling both the conduit sections 14, 16 and core sections 13, 15 to facilitate assembly and installation of the cable system 10. The first and second cable sections 11, 12 may also be removably connected together so that they may be separated and the cable system 10 may be serviced. Of course, the cable system 10 may be used in applications other than a transmission shifter implementation.

As shown in FIG. 3, at its end portion opposite the end portion connected to the transmission shift control arm 17, the first core section 13 may be coupled to a first core connector 20. The first core connector 20 may include one or more fingers 22 extending from a base 24. The first core connector 20 may be formed from more than one body and each body may include a portion of the base 24 and one or more fingers 22 extending therefrom. The fingers 22 may each extend to a free end 26 and may be spaced apart about an axis 28 generally circumferentially and radially. Each finger 22 may include a cavity 30 adjacent its free end and collectively, the cavities may define a socket 32 between the fingers 22. The socket 32 may have a size (e.g. in at least one dimension) that is greater than the minimum size of an entrance opening 34 defined between the fingers 22 axially spaced from the socket 32 at the free ends 26 of the fingers. The entrance opening 34 may be tapered and have a larger size at the free ends 26 of the fingers 22 and a smaller size as the opening extends inwardly of the fingers. This may facilitate alignment of an object to be received between the fingers 22. The fingers 22 may be flexible and resilient so that the ends 26 of the fingers 22 may flex or move relative to each other, and may return to their original unflexed orientations when not acted upon by a force tending to separate them.

The first core connector 20 may also include a connection feature 36 to which the end of the first core section 13 may be connected. In the implementation shown, the first core connector 20 includes two separate bodies (20a and 20b, labeled only in FIG. 4) which may be identical in shape and size, with one body 20b inverted relative to the other body 20a providing a clamshell. The connection feature may include a cavity 36 defined in the base 24, and a knob 40 may be provided on the end of the first core section 13 and sized for receipt in the cavity 36 so that the knob 40 is trapped between the bodies 20a, 20b of the first core connector 20 in assembly, as shown in FIG. 3. To accommodate the core section 13, a slot or passage 42 may extend from the cavity 36 through the free end of the base 24. When multiple bodies are used to define the first core connector 20, a ring or clip 44 may be crimped or otherwise incorporated around or about at least a portion of the base to couple the bodies together, if desired. The first core connector may be formed of any suitable material such as various plastics and metals and is shown in the drawings as being formed from a plastic material.

Figure 4:
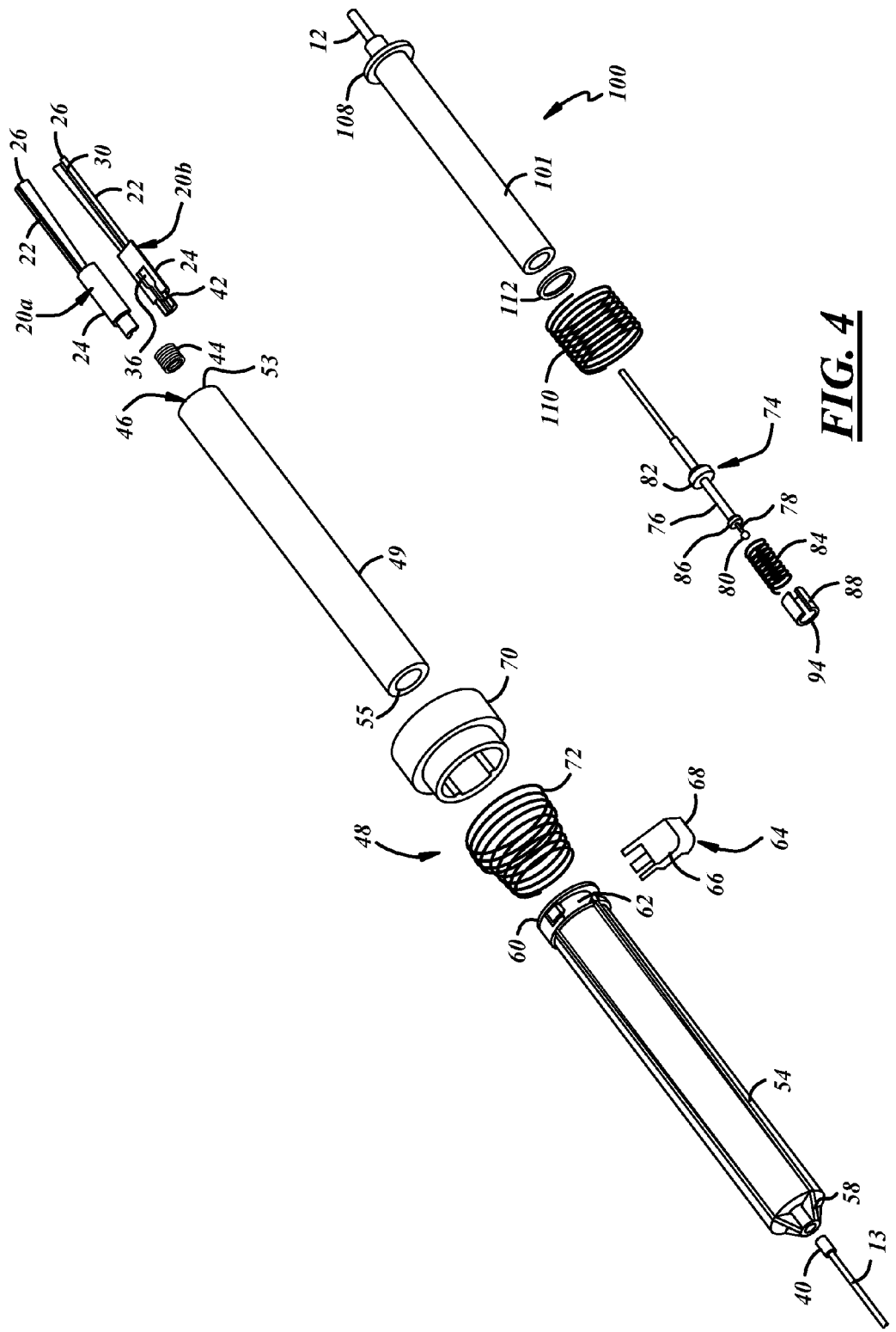
FIG. 4 is an exploded view of the cable system.

At least a portion of the first core connector 20 may be received within a passage 46 defined in a first conduit connector 48. In at least one possible form, the first conduit connector 48 may comprise or include a generally cylindrical first tube 49 that may be fixed or otherwise coupled to the first conduit section 14 with at least a portion of the first core connector surrounded by the first tube 49. The first tube 49 may be open at its first end 53 and the first cable section 11 may extend out of its second end 55, as shown in FIGS. 3 and 4. The first tube 49 may be formed of any suitable material including various plastics and metals and is shown in the drawings as being formed from a plastic material. The passage 46 may have a first portion 50 and a second portion 52 with a larger diameter than the first portion.

In assembly, as shown in the drawings, at least a portion of the base 24 may be received in the first portion 50 of the passage 46 and the first portion 50 may be sized to closely receive the base. This may inhibit or prevent separation of the bodies 20a, 20b to keep the base portions 24 and the fingers 22 in a desired alignment and orientation relative to one another and the first conduit connector 48. This may also inhibit or prevent significant flexing of the core section 13 relative to the first tube 49 and/or first conduit 14. The base 24 may be slidably received and guided within the first portion 50 to permit movement of the first core section 13 relative to the first conduit section 14. The fingers 22 may extend into the second portion 52 of the passage 46 and a gap may be defined between the fingers 22 and the first tube 49 in the area of the second portion.

The first conduit connector 48 may also include a locking tube 54. In the implementation shown, the first tube 49 is fully received within the locking tube 54 which has an opening 56 at a first end 58 through which the first core section 13 extends and is open at its second end 60 and generally coaxially aligned with the first tube 49. The locking tube 54 may be formed from any suitable material such as various plastics and metals, and is shown in the drawings as being formed from a plastic material. One or more slots 62 may be provided adjacent to the second end 60 of the locking tube 54 to receive a conduit coupler or locking member 64 that may releasably lock together the first and second conduit connectors.

The locking member 64 may include an inner surface with one or more locking features 66 formed therein or carried thereby, and an outer surface 68 that extends out of the locking tube 54. The locking member 64 may be slidably moved within the slot(s) 62 between a first or unlocked position wherein the locking features 66 are radially spaced outwardly from an inner surface of the locking tube 54 and a second or locked position wherein the locking features 66 are advanced radially inwardly and the locking features are located at or radially inwardly of the inner surface of the locking tube 54. A cover 70 may be provided to overlie the locking member 64 when the locking member is in its second or locked position. The cover 70 may be yieldably biased, such as by a spring 72, away from a first position wherein the cover 70 does not overlie the locking member 64 (shown in FIG. 3) and a second position wherein the cover 70 overlies the locking member 64 (shown in FIG. 11). The locking member 64, when in its unlocked position, may engage the cover 70 and hold the cover in its first position, as shown in FIG. 3. And when the locking member 64 is moved to its locked position, the spring 72 may move the cover 70 to its second position wherein the cover overlies the locking member 64 to prevent inadvertent or unintended release of the locking member from its locked position. The locking member 64 and cover 70 may be formed from any suitable material such as various plastics and metals, and are shown in the drawings as being formed from a plastic material.

At its end opposite the end connected to the vehicle shifter 18, the second core section 15 may be coupled to a second core connector 74. The second core connector 74 may include a connector body having a shank 76, a stem 78 extending from the shank and a head 80 extending from the stem. The second core section 15 may be coupled to the shank 76 such as by a crimp, weld, clamp, or mechanical fastener. Between the shank 76 and head 80, one or more flanges may be provided. In the implementation shown, a first flange 82 may provide a seat for a biasing member, such as a spring 84. A second flange 86 may provide a seat for a collar 88. The stem 78 may comprise a reduced diameter portion of the shank 76, and the head 80 may have at least a portion that is larger than the stem 78, in at least one dimension. In the implementation shown, the head 80 is an enlarged, generally spherical bulb at the end of the stem 78, is generally round and has a diameter that is greater than the diameter of the stem 78. The second core connector 74 may be formed from any suitable material such as various plastics and metals, and is shown in the drawings as being formed of metal, such as stainless steel.

The collar 88 may be annular, and may include a main bore 90 that slidably receives the shank 76, a counterbore 92 and a leading end or edge 94. An annular and radially inwardly extending shoulder 96 may be defined at the transition between the bore 90 and the counterbore 92. A biasing member, such as the spring 84, may bear at one end on the first flange 82 and at its other end on the collar 88 to yieldably bias the collar toward its first or extended position, as shown in FIG. 3, wherein the shoulder 96 engages the second flange 86 to retain the collar on the shank 76. In the extended position, the collar 88 extends beyond the second flange 86 and may surround at least a portion of the stem 78. From its extended position, the collar 88 is slidable or movable against the biasing force of the spring 84 to a second or retracted position as shown in FIG. 8 wherein the collar 88 is moved closer to the first flange 82 and away from the head 80. The counterbore 92 provides an inner diameter that is larger than the head 80 and provides a gap between the head and the collar 88 that is larger enough to receive the ends of the fingers 22 between the head 80 and collar 88. In at least one implementation, at least a portion of the head 80 extends axially beyond the leading edge 94 of the collar 88.

The second core connector 74 and collar 88 may be at least partially received within a second conduit connector 100. The second conduit connector 100 may comprise or include a second tube 101 that may be fixed or otherwise coupled to the second conduit section 16. The second tube 101 may be generally cylindrical and define a passage or cavity 102 in which the second core connector 74 is received with at least a portion of the second core connector surrounded by the second tube 101. The second tube 101 may be generally open at its first end 104, to receive the fingers 22 of the first core connector 20 therein, and may have an opening at its second end 106 through which the second core section 15 extends. The outer diameter of the second tube 101 may be smaller than the inner diameter of the second portion 52 of the first conduit connector 48 so that at least a portion of the second tube 101 may be received within the first tube 49, when the cable system 10 is assembled. The inner diameter of the second tube 101 may be sized for a relatively close fit between the first flange 82 and the collar 88, to maintain a generally coaxial alignment of the second core connector 74 and collar 88, and to guide the sliding movement of the second core connector 74 as the second core section 15 is moved relative to the second conduit section 16. This may also inhibit or prevent flexing of the core section 15 within the second tube 101 and/or conduit section 16. An outwardly extending flange or seat 108 may be provided to retain a biasing member, such as a spring 110 disposed about the exterior of a portion of the second tube 101. The second tube 101 may be formed from any suitable material such as various plastics and metals, and is shown in the drawings as being formed from a plastic material.

The second conduit connector 100 may also carry a seal 112, such as an o-ring, in a peripheral groove formed in the outer surface of the second tube 101. The seal 112 may inhibit or prevent contaminants from entering between the first and second tubes 49, 101 when they are assembled. The second conduit connector 100 may also have one or more locking features 114 on or carried by its periphery and adapted to cooperate with the locking features 66 of the locking member 64 to releasably lock or connect the first and second tubes 49, 101 together. Finally, the second conduit connector 100 may include an access feature generally axially aligned with the collar (shown only in FIG. 2). The access feature may include a slot or void 116 extending through the second tube 101 and providing physical access to the collar 88 from outside of the second tube 101 to facilitate disassembly or decoupling of the cable system 10 as will be discussed in more detail below.

To couple together the first core connector 20 and second core connector 74, and thereby connect together the first core section 13 and the second core section 15, the second tube 101 is inserted into the first tube 49 until the connectors 20, 74 are coupled together. What occurs as the second tube 101 is increasingly inserted into the first tube 49 to couple the connectors 20, 74 is shown in FIGS. 2, 3 and 5-11 and described below.

As shown in FIGS. 2 and 3, prior to mating the second conduit connector 100 and the first conduit connector 48, the fingers 22 are not outwardly flexed and are positioned generally within and spaced about the center of the passage 46, and the collar 88 is urged into its extended position against the second flange 86 by the spring 84. To mate or couple the first and second conduit connectors 48, 100, the first end 104 of the second tube 101 is aligned with and initially inserted into the open end of the first tube 49 as shown in FIGS. 5 and 6. In this position, the conduit connectors 48, 100, and the socket 28 and head 80 are generally coaxially aligned.

When the second tube 101 is inserted to the position shown in FIG. 7, the head 80 initially engages the ends 26 of the fingers 22. Because the head 80 is larger than the entrance opening 34 defined between the fingers 22, the fingers 22 are outwardly flexed apart as the head 80 enters the gap between the fingers 22. As the second tube 101 is further advanced into the first tube 49, the leading edge 94 of the collar 88 engages the outwardly flexed fingers 22 and continued advancement of the head 80 between the fingers 22 occurs without a corresponding movement of the collar 88 which is held in position against the fingers 88, as shown in FIG. 8. The spring 84 is compressed by the movement of the first flange 82 relative to the collar 88 as the head 80 is further advanced between the fingers 22.

As shown in FIG. 9, when second tube 101 is advanced within the first tube 49 far enough that the head 80 is received within the socket 28 (which is large enough to at least partially accommodate the head 80), the resiliency of the fingers 22 causes them to return to or at least partially toward their original, not flexed positions wherein the ends 26 of the fingers 22 are adjacent to the stem 78. In this position, the fingers 22 no longer engage the edge 94 of the collar 88 and the spring 82 returns the collar 88 to its advanced position, as shown in FIG. 9. In this position, at least a portion of the collar 88 overlies at least a portion of the fingers 22. These components are sized such that the fingers 22 cannot be flexed outwardly sufficiently to remove the head 80 from the socket 28 while the collar overlaps the fingers 22 as shown in FIG. 9. That is, the fingers 22 overlap the head 80 more than the fingers 22 can be outwardly displaced or flexed within the collar 88 so that, when the collar 88 overlies the fingers 22, the head 80 cannot be removed from the socket 28. In this manner, the first core connector 20 and second core connector 74 are firmly coupled together and the cable sections 11, 12 may function like a single length of cable.

Further, any slack in the coupled cable sections 11, 12 can be taken up or adjusted for prior to or at the time of connecting the end of the first core section 13 to the transmission lever 17 and/or the end of the second core section 15 to the vehicle shifter 18. When the cable sections 11, 12 have been adjusted as desired, the conduit connectors 48, 100 may be locked together to provide further retention of the cable system 10.

To lock the conduit connectors 48, 100 together, the locking member 64 may be moved from its unlocked position shown in FIG. 9 to its locked position shown in FIGS. 10 and 11. In its locked position, the locking features 66 of the locking member 64 engage the locking features 114 of the second tube 101. In the implementation shown, the locking features 114 include complementary and alternating grooves and lands between the grooves that may be mated together to inhibit or prevent movement of the second tube 101 relative to the locking tube 54 and first tube 49. When the locking member 64 is advanced sufficiently into the slot 62 so that the locking member 64 no longer engages the cover 70, the cover 70 may be moved over the locking member 64 to trap the locking member in its locked position and inhibit or prevent inadvertent release of the locking member from its locked position. In the implementation shown, the spring 72 automatically moves the cover 70 to its extended position over the locking member 64 when the locking member is moved out of the way of the cover.

To decouple the conduit connectors 48, 100 and core connectors 20, 74, the cover 70 of the locking tube 54 may be moved to its retracted position against the force of the spring 72 until the cover no longer overlies the locking member 64. The locking member 64 may then be returned to its relieved or unlocked position wherein its locking features 66 are not engaged with the locking features 114 of the second tube 101. The second tube 101 may then be withdrawn until the access feature 116 is exposed outside of the first tube 49 and locking tube 54. To do this, slack may need to be provided in the first cable section 11, or if that is not possible, then one or both of the core sections 13, 15 may be disconnected from their respective one of the transmission lever 17 and vehicle shifter 18. When the access feature 116 is exposed, an implement may be inserted into the second tube 101 through the access feature 116 to displace the collar 88 axially away from the fingers 22 until the collar 88 no longer overlies the fingers 22. Then, with the collar 88 removed from the fingers 22, the head 80 may be withdrawn from the socket 28 by further withdrawing the second tube 101 from the first tube 49 while limiting movement of the first core connector 20 (e.g. by limiting movement of the first core section 13). Once that is accomplished, the first and second core connectors 20, 74 are no longer coupled and the second tube 101 can be fully withdrawn from the first tube 49 to decouple the first and second conduit connectors 48, 100.

Accordingly, the cable system 10 enables easy and secure coupling of the first and second cable sections 11, 12, and also permits decoupling of the cable sections so that the cable system is serviceable. In an implementation where the first and second conduit connectors 48, 100 are provided, the alignment and coupling of the first and second core connectors 20, 74 (e.g. the head 80 and fingers 22/socket 28) can be easily assured by desired positioning of the core connectors relative to the conduit connectors to facilitate assembly and ensure a proper coupling of the core connectors 20, 74. In this manner, coupling of the first and second conduit connectors 48, 100 (such as may be done by simply mating the first and second tubes 49, 101 together) automatically couples together the first and second core connectors 20, 74. That is, in at least one implementation, simply inserting one tube 49 or 101 into the other tube causes the core connectors 20, 74 to engage and become coupled together without requiring separate manipulation of either of the first or second core connectors. To accomplish this, the distance from the socket 28 to the end 60 of the first tube 49 plus the distance from the head 80 to the end 104 of the second tube 101 is approximately equal to the length of the second tube 101 that is inserted into the first tube 49 when the cable sections 11 and 12 are fully connected together. This greatly facilitates aligning and coupling together the core connectors 20, 74 to ensure a desired coupling of the first and second core sections 13, 15, while at the same time providing a desired coupling of the first and second conduit sections 14, 16.

Further, because the fingers 22 do not retain the head 80 on their own and are instead trapped against the head 80 by the collar 88, the fingers 22 can be relatively easy to deflect away from each other. That is, the fingers 22 need not be stiff, rigid pieces capable of resisting a desired withdrawal force of the head 80 by themselves. In this way, the head 80 may be installed into the socket 28 with relatively little force needed to separate the fingers 22 and push the head 80 between the fingers 22. In at least some implementations, the installation force may be less than fifty (50) Newtons. Likewise the force to remove the head 80 from the socket 28 and decouple the first and second conduit connectors 48, 100, and the first and second core connectors 20, 74, may also be less than fifty (50) Newtons.

While the forms of the invention herein disclosed constitute presently preferred embodiments, many others are possible. It is not intended herein to mention all the possible equivalent forms or ramifications of the invention. For example, while the conduit connectors 48, 100 have been described as including tubes 49, 101 and possibly other components, the conduit connectors 48, 100 may include only the tubes 49, 101 or they may include components in addition to or instead of the components specifically shown and described herein. It is understood that the terms used herein are merely descriptive, rather than limiting, and that various changes may be made without departing from the spirit or scope of the invention.

The invention claimed is:

1. A multi-piece shifter cable system, comprising:
a first cable section including a first core section and a first conduit section;
a second cable section having a second core section and a second conduit section;
a first core connector coupled to the first core section;
a second core connector coupled to the second core section;
a first conduit connector coupled to the first conduit section and located adjacent to the first core connector;
a second conduit connector coupled to the second conduit section, located adjacent to the second core connector, and adapted to be coupled to the first conduit connector to connect together the first conduit section and the second conduit section;
a collar moveable relative to the first core connector and the second core connector to permit the first core connector and the second core connector to be coupled or decoupled, and moveable with the first core connector to prevent unintended decoupling of the first core connector and the second core connector, and wherein one of the first conduit connector and the second conduit connector receives at least a portion of the other conduit connector and the collar is at least partially overlapped by said conduit connector that is received in at least a portion of the other conduit connector.

2. The cable system of claim 1 wherein the first core connector includes a socket and the second core connector includes a head that is received within the socket when the first core connector and the second core connector are coupled together, the first core connector having a movable portion defining part of an opening leading to the socket, the movable portion permitting the size of the opening to be increased to receive the head into the socket and decreased to prevent removal of the head from the socket, and wherein the collar has a first position in which movement of the movable portion is permitted and a second position, and when the collar is in its second position the collar prevents movement of the movable portion to a position where the head may be removed from the socket to thereby maintain the first core connector and the second core connector coupled together.

3. The cable system of claim 2 wherein the first conduit connector includes a first tube in which at least a portion of the first core connector is received, and the second conduit connector includes a second tube in which at least a portion of the second core connector is received and the first tube and second tube are mated together when the first conduit connector and second conduit connector are coupled together, and wherein the distance from the socket to the end of the first tube plus the distance from the head to the end of the second tube is equal to the length of the second tube that is inserted into the first tube when the first core connector and the second core connector are coupled together.

4. The cable system of claim 2 wherein the socket receives the head within the socket under a force of less than 50 Newtons.

5. The cable system of claim 2 wherein the first core connector includes at least two separate bodies, each of said at least two separate bodies defining part of the socket.

6. The cable system of claim 1 wherein the first conduit connector includes a first tube in which at least a portion of the first core connector is received, and the second conduit connector includes a second tube in which at least a portion of the second core connector is received and wherein the first tube and the second tube are mated together when the first conduit connector and second conduit connector are coupled together and the second tube is positioned to maintain coaxial alignment of the collar within the second tube.

7. The cable system of claim 6 wherein when the first conduit connector and second conduit connector are coupled together, the first core connector and the second core connector are automatically coupled together without requiring separate manipulation of either of the first core connector or the second core connector.

8. The cable system of claim 6 wherein the second tube includes an access feature permitting access to the interior of the second tube even when the first core connector and the second core connector are coupled together.

9. The cable system of claim 8 wherein the access feature is axially aligned with the collar so that an implement may be inserted through the access feature to move the collar.

10. The cable system of claim 7 wherein the access feature permits access to the collar from outside the second tube so that the collar may be moved relative to the first core connector and the second core connector and the first core connector and the second core connector decoupled to facilitate service or repair of the cable system.

11. The cable system of claim 10 wherein the access feature includes a slot formed in the second tube.

12. The cable system of claim 6 which also includes a locking tube and a locking member that releasably lock together the locking tube and at least one of the first tube and second tube to inhibit disengagement of the first tube and second tube and the first core connector and the second core connector.

13. The cable system of claim 12 wherein the locking tube surrounds at least a portion of the first tube.

14. The cable system of claim 1 wherein the collar is overlapped by at least a portion of both the first conduit connector and the second conduit connector.

15. The cable system of claim 1 which also includes an access feature defined at least in part by a void formed in the conduit connector that is received in at least a portion of the other conduit connector.

16. The cable system of claim 15 wherein the access feature is axially aligned with the collar so that an implement may be inserted through the access feature to move the collar.

* * * * *